Feb. 13, 1951 W. R. SHIELDS ET AL 2,541,672
BRAKE LINING APPLYING MECHANISM
Filed Oct. 24, 1947

INVENTOR.
William R. Shields.
Edward R. Marks.
BY Harness, Dickey & Pierce.
ATTORNEYS.

Patented Feb. 13, 1951

2,541,672

UNITED STATES PATENT OFFICE 2,541,672

BRAKE LINING APPLYING MECHANISM

William R. Shields, Birmingham, and Edward R. Marks, Centerline, Mich.

Application October 24, 1947, Serial No. 781,776

14 Claims. (Cl. 154—1)

This invention relates generally to clamping mechanisms and more particularly to a novel form of clamping mechanism for holding brake lining material to a brake shoe while it is being adhered thereto.

An object of this invention is to provide a simple and economical mechanism for clamping brake lining material to brake shoes whereby the lining material may be cemented thereon.

Another object is to provide a mechanism wherein the brake shoes themselves are used as one element of the clamping mechanism.

Another object is to provide such a clamping mechanism in which a flexible strip member forms an element of the clamping mechanism so that irrespective of slight irregularities in the contour of the brake shoe the brake lining material is held to the brake shoes.

Another object is to provide such a clamping mechanism in which the lining material may be readily clamped to the brake shoe for adhering therewith and the brake shoe with the lining adhered thereto may be readily removed from the mechanism.

Another object is to provide such a clamping mechanism which may be readily adapted for clamping various sized brake shoes with a minimum change of parts.

Other objects will be apparent from a reading of the specification and appended claims and a studying of the drawing, in which drawing the same parts are referred to by the same reference characters.

Figure 1:
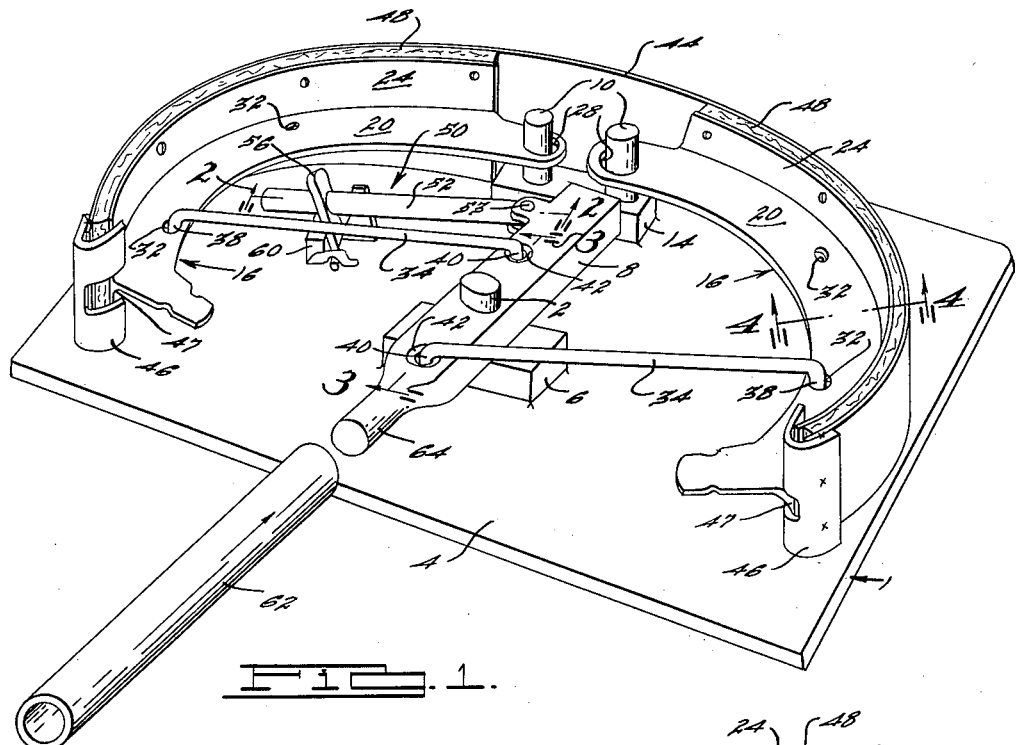
Figure 1 is a perspective view of a clamping mechanism embodying the invention.
Figure 4:
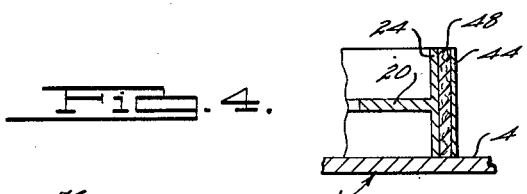
Fig. 4 is a view taken substantially along the line 4—4 of Fig. 1 and looking in the direction of the arrows.
Figure 2:
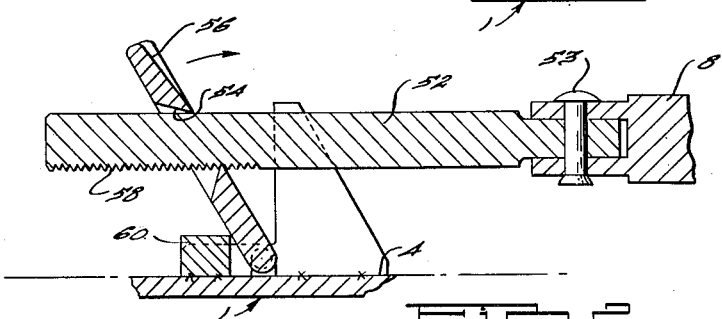
Fig. 2 is a view taken substantially along the line 2—2 of Fig. 1 and looking in the direction of the arrows.
Figure 3:
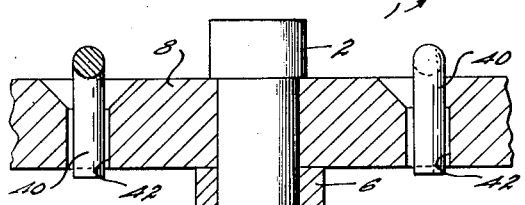
Fig. 3 is a view taken substantially along the line 3—3 of Fig. 1 and looking in the direction of the arrows.

Although the present invention is specifically illustrated as being associated with brake shoes and while it has particular utility when so used, it will be appreciated by those skilled in the art that, in its generic aspects, it has other uses within the scope of the present invention. The drawings therefore are to be taken as illustrative rather than limitative of the invention which is to be limited only by the scope of the hereinafter appended claims.

Generically the invention contemplates the utilization of the increasing peripheral dimension of a pair of fulcrumed brake shoes, such dimension being measured from free end to free end along the surface thereof as the shoes are rotated about their fulcrum points whereby a clamping strip member held to these free ends is tensioned about the lining material for clamping the same against the shoes. In its more specific form, and certain utility is had by so doing, clamps are provided for holding the clamping strip for movement with, but against movement relative to, the free end portions of the brake shoes and to apply the force for rotating the shoes directly thereto.

Referring to the drawings by character of reference, the numeral 1 designates generally a base for the clamping mechanism which may be in the shape of a substantially rectangular plate as shown. A pivot pin 2 is carried by the base 1 and extends upwardly from the upper surface 4 of the base member 1 through an aperture in a spacer member 6, preferably welded to the surface 4. The member 6 reinforces the pin 2 and also spaces the clamping lever 8 upwardly from the top surface 4. A pair of brake shoe fulcrum pins 10 extend upwardly from the surface 4 through apertures in a reinforcing member 14 welded to the top surface 4. A pair of brake shoes 16 having webs 20, respectively, and lining supporting flanges 24 are fulcrumed on the pins 10 which extend through the usual web apertures 28. As is usual in the construction of brake shoes, the webs 20 will have a plurality of apertures 32 therethrough which, when the brake shoes are placed upon the motor vehicle, are functionally used in connection with the brake operating mechanism.

A pair of clamping rods 34 each have downwardly extending opposite end portions 38 and 40. The portions 38 of the rods 34 are received within convenient ones of the apertures 32 of the brake shoes while the portions 40 of each of these rods are received within apertures 42 in the lever 8; one such aperture being located on either side of the lever fulcrum point 2. A thin strip member 44 has, at either end, end members 46 having rebent bifurcated portions which are received around the ends 47 of the brake shoes opposite to the ends having the apertures 28.

The ends 47 of the brake shoes 16 are inserted in the end members 46 with the strip member 44 substantially straight or only slightly arcuate. The lining material 48 is inserted between the flanges 24 and the member 44 and the assembly placed on the surface 4 with the pins 10 extending through the apertures 28. The free brake shoe ends 47 are then manually brought toward each other until the strip member 44 is slightly taut after which the rods 34 are put in place as described above.

The lever member 8 is rotated in a clockwise direction (see Fig. 1) whereby the rods 34 and 36 will pull the free ends 47 of the brake shoes toward each other thereby tightening the strip member 44 around the brake shoes so that the brake lining material 48 is forced into intimate engagement with the outer surface of the flanges 24. The movement toward each other of the free ends of the brake shoes 16 will increase the outer peripheral dimension so that the strip member 44 which is of mixed length will clamp the brake lining material 48 tightly against the flanges 24.

An automatic locking arrangement designated generally by the numeral 50 holds the lever member 8 in its rotated position and comprises a rod 52 pivoted at one end as by a pivot pin 53 to the lever member 8. The other end portion of the rod 52 extends through a conically-shaped aperture 54 in a member 56 pivoted at its lower end to the top surface 4 of the base member 1. As the lever member 8 is rotated in a clockwise direction, the pivoted member 56 will be moved toward its vertical position by the rod 52 so that the aperture 54 thereof presents a more nearly circular opening whereby the rod 52 may slide through the aperture 54. When it is desired to lock the lever member 8 in its rotated position, the pivoted member 56 is rotated manually in a counterclockwise direction (see Fig. 1) whereby the aperture 54 presents a contour which, with respect to a plane perpendicular to the axis of the round rod 52, is more elliptical whereby the rod 52 is locked against movement in a left-hand direction relative to the pivoted member 56. If desired, serrations 58 may be provided along the lower and/or upper surface of the rod 52 to assist the holding of the rod 52 by the pivoted member 56. A stop member 60 is provided on the top surface 4 of the base member 1 to limit rotational movement of the pivoted member 56.

When it is desired to remove the brake shoes 16, enough force is applied to the lever member 8 in a direction tending to rotate it in a clockwise direction so that the pivoted member 56 may be rotated manually in a clockwise direction, whereby the rod 52 is free to slip through the aperture 54 upon releasing the clockwise rotational force applied to the lever member 8. When substantially all of the stress has been removed from the rods 34, they may be lifted upwardly out of the apertures 32 and 42 after which the brake shoes together with the strip 44 may be lifted upwardly from the base 1 and the fulcrum pins 10. Subsequently, the brake shoes 16 may be removed in an obvious manner from the strip member 44.

If desired, a tubular extension 62 may be associated with the lever member 8 and may be received over a cylindrical portion 64 of the lever member 8. The extension 62 may be removed after the strip 44 has been tensioned around the brake shoes 16, as above described, so that when the assembly containing the clamped brake shoes is placed in an oven for curing of the cement material, by which the brake lining material 48 is bonded to the outer surface of the brake flanges 24, it will occupy a minimum of space and a relatively small oven may be used.

The brake shoes 16 may be of varying sizes, depending upon the application for which they have been made and our mechanism may be utilized for these various sizes by using strip members 44 and rods 34 of the correct dimensions. The clamping mechanism, therefore, may be used for universally clamping any and all size of brake shoes for relining purposes by the interchanging of a few well chosen members 44 and rods 34. This is especially desirable when the clamping devices are used by service stations for replacing worn linings.

What is claimed and is desired to be secured by United States Letters Patent is as follows:

1. In a mechanism of the character described for clamping a pair of brake linings to a pair of brake shoes each having an abutment offset from the surface to which the lining is to be clamped, a supporting member, abutment means carried by said member to provide fulcrums for such shoe abutments to position one end portion of each of a pair of such brake shoes, an elongated laterally flexible member adapted to extend around the outer peripheral surface of such pair of brake shoes and having spaced clamping portions engageable with such linings and joined together by a connecting portion and having anchoring portions connectible with the free end portions of such brake shoes, and means for drawing the free end portions of such shoes toward each other whereby such shoes are rocked about said fulcrum and said elongated member is thereby tensioned whereby said clamping portions clamp such linings to such shoes.

2. In a mechanism of the character described for clamping a pair of brake linings to a pair of brake shoes each having an abutment offset from the surface to which the lining is to be clamped, a supporting member, abutment means carried by said member to provide fulcrums for such shoe abutments to position one end portion of each of a pair of such brake shoes, an elongated laterally flexible member adapted to extend around the outer peripheral surface of such pair of brake shoes and having clamping portions engageable with such linings and joined together by a connecting portion and having anchoring portions connectible with the free end portions of such brake shoes, means for moving the free end portions of such brake shoes in an inward direction about said fulcrum whereby said elongated member is tensioned about the outer peripheral surface of the brake shoes, and means for holding said moving means with said flexible member in its tensioned position.

3. The combination of claim 1 in which said anchoring portions comprise rebent bracket members suitably secured to said elongated member end portions.

4. The combination of claim 2 in which said moving means comprises a fulcrum lever member having connecting means extending therefrom to the brake shoes at either side of the point at which said fulcrumed member is fulcrumed.

5. The combination of claim 2 in which said holding means comprises a pair of pivoted members.

6. The combination of claim 5 in which serrations are provided on one of said holding members whereby they may be frictionally clamped against relative movement.

7. A clamping mechanism for a pair of brake shoes, each having an arcuate surface for receiving a brake lining and an apertured abutment set inwardly from its arcuate surface comprising a platelike base having an upper surface, a pair of pins carried by said base and extending outwardly of said surface, each said pin being adapted to receive thereover an individual one of such apertured abutments whereby such arcuate surfaces face outwardly of such shoes, a strip member having laterally flexible clamping portions joined together by a connecting portion and having opposite end portions, securing portions carried by said end portions and engageable with the free end portions of such brake shoes opposite to such apertured abutments, and means for moving said free end portions toward each other whereby said strip member is tensioned about the brake shoes.

8. The combination of claim 7 in which said moving means comprises a lever member fulcrumed on said base.

9. The combination of claim 8 in which locking means is provided for holding said strip member in a tensioned position.

10. A clamping mechanism for brake shoes comprising a platelike base having an upper surface, a pair of pins carried by said base and extending outwardly of said surface, said pins being adapted to receive thereover apertured end portions of a pair of brake shoes, a strip member having opposite end portions, securing portions carried by said end portions and adapted to engage the free end portions of said brake shoes opposite to said apertured end portions, and moving means for moving said free end portions toward each other, said moving means comprising a lever member fulcrumed on said base, a pair of removable rods, one of said rods being adapted to be secured at one end portion thereof to said lever member at one side of its fulcrum point and the other of said rods being adapted to be secured at one end portion thereof to said lever member at a side of said fulcrum point opposite to said one side, the other end portion of said rods each being adapted to be secured to a different one of the brake shoes whereby rotation of said lever member about its fulcrum point will move said shoe free end portions toward each other to tension the said strip member about the brake shoes.

11. In a mechanism for clamping brake linings to brake shoes of the type having an outer arcuate surface and arranged in end-to-end relation with adjacent ends arranged to pivot about relatively fixed fulcrums spaced inwardly of such arcuate surfaces comprising an elongated laterally flexible member adapted to encompass such shoes, said member having spaced clamping portions adapted to individually overlie such linings and joined together by a connecting portion, anchoring portions carried by said member individually connectible with the ends of such shoes opposite to the adjacent ends of such shoes, and means for drawing such opposite shoe ends in a direction toward each other whereby to pivot such shoes about such fulcrums to tension said elongated member.

12. A clamping mechanism for brake shoes having an arcuate surface for receiving a brake lining and an apertured abutment set inwardly from its arcuate surface comprising a support, a pin carried by said support for receiving said apertured abutment, a laterally flexible elongated member having a clamping portion overlying such lining, anchoring portions carried by one end portion of said clamping portion engageable with such shoes at an end portion thereof, said clamping portion having an opposite end portion held against movement with such shoe, and means for rotating such shoe about said pin in a direction away from such arcuate surface whereby said member will be tensioned and said clamping portion will hold such lining to such arcuate surface.

13. In a mechanism for clamping brake linings to brake shoes of the type having an outer arcuate surface and an abutment set inwardly from the surface, a support adapted to support a pair of such shoes, means providing an abutment on said support to be engaged by the abutment of one shoe of such pair of shoes, a flexible band having anchoring means at each end portion, said band being adapted to overlie the linings of such shoes and said anchoring means being adapted to hold said end portions against movement relative to such shoes, and means exerting a force between said support and said one shoe of such pair whereby said one shoe is pivoted about said abutments to tighten said band about such lining.

14. In a mechanism for clamping a brake lining to a brake shoe of the type having an outer arcuate surface and an abutment set inwardly from the surface to be pivoted, a supporting member, an abutment carried by said member and adapted to be engaged by such shoe abutment, an elongated flexible member having a clamping portion adapted to overlie such lining and an anchoring portion connectible with a first end portion of such shoe, means for anchoring the opposite end of said clamping portion against movement in one direction relative to said support member abutment, and means exerting a force between said supporting member and such shoe for rotating such shoe about such abutment to tension said clamping portion about such lining.

WILLIAM R. SHIELDS.
EDWARD R. MARKS.

REFERENCES CITED

The following references are of record in the file of this patent:

UNITED STATES PATENTS

| Number | Name | Date |
| --- | --- | --- |
| 1,869,343 | Parker | July 26, 1932 |
| 1,903,058 | McNaught | Mar. 28, 1933 |
| 1,910,507 | Stoner | May 23, 1933 |

Certificate of Correction

Patent No. 2,541,672                                            February 13, 1951

WILLIAM R. SHIELDS ET AL.

It is hereby certified that error appears in the printed specification of the above numbered patent requiring correction as follows:

Column 3, line 16, for the word "mixed" read *fixed*;

and that the said Letters Patent should be read as corrected above, so that the same may conform to the record of the case in the Patent Office.

Signed and sealed this 10th day of April, A. D. 1951.

[SEAL]

THOMAS F. MURPHY,
*Assistant Commissioner of Patents.*